United States Patent [19]

Wenzel

[11] Patent Number: 4,683,964

[45] Date of Patent: Aug. 4, 1987

[54] DOWNHOLE DRILL BIT DRIVE APPARATUS

[75] Inventor: Kenneth H. Wenzel, Edmonton, Canada

[73] Assignee: Maxi-Torque Drill Systems, Inc., Edmonton, Canada

[21] Appl. No.: 791,217

[22] Filed: Oct. 25, 1985

[51] Int. Cl.⁴ .............................................. E21B 4/14
[52] U.S. Cl. .................................................... 175/107
[58] Field of Search ............... 175/107, 101, 320, 104, 175/106; 384/619, 304; 277/103, 127, 173, 176, 177, 27

[56] References Cited

U.S. PATENT DOCUMENTS

| | | | |
|---|---|---|---|
| 3,232,362 | 2/1966 | Cullen et al. | 175/104 |
| 3,587,348 | 6/1971 | Popa et al. | 175/106 X |
| 3,669,199 | 6/1972 | Cullen et al. | 175/106 |
| 3,894,818 | 7/1975 | Tschirky | 175/107 X |
| 4,090,574 | 5/1978 | Garrison | 175/106 |
| 4,108,023 | 8/1978 | Garrison | 175/106 X |
| 4,114,703 | 9/1978 | Matson, Jr. et al. | 175/107 |
| 4,170,441 | 10/1979 | Trzeciak | 175/107 X |
| 4,222,445 | 9/1980 | Vedetsky et al. | 175/106 |
| 4,254,669 | 3/1981 | Schultz | 175/106 X |
| 4,295,535 | 10/1981 | Crase et al. | 175/107 X |
| 4,314,615 | 2/1982 | Sodder, Jr. et al. | 175/107 X |
| 4,329,127 | 5/1982 | Tschirky et al. | 175/107 X |

OTHER PUBLICATIONS

"Machinoexport" brochure, Stan-Canada, Inc.
Baker Service Tools, Brochure.
"INA-Walzlager, Einbaubeispiele Fur" INA brochure.

*Primary Examiner*—Stephen J. Novosad
*Assistant Examiner*—Thuy M. Bui
*Attorney, Agent, or Firm*—Hayes, Davis & Soloway

[57] ABSTRACT

A downhole drill bit drive apparatus comprises a tubular housing adapted to be secured to the downhole end of a drill string, a mandrel concentrically disposed within the housing and having one end adapted to be secured to a downhole rotary drive and an other end adapted to be secured to a drill bit, the housing and the mandrel defining a fluid flow passage for transmitting drilling fluid to a drill bit secured to the mandrel, bearing assembly disposed between the housing and the mandrel for permitting rotation of the mandrel within the housing and transmitting axial and radial loads between the housing and the mandrel, a first seal at one end of the bearing assembly defining one end of a bearing chamber for housing the bearing assembly and a lubricating fluid for lubricating the bearing assembly and being operable to seal the chamber from the fluid flow passage and maintain the pressure in the flow passage and in the chamber substantially at equilibrium, and a second seal at the other end of the bearing assembly defining the other end of the bearing chamber and being operable to seal the chamber from the exterior of the housing.

13 Claims, 12 Drawing Figures

DOWNHOLE DRILL BIT DRIVE APPARATUS

This invention relates to an improved downhole drill bit drive apparatus assembly of the type employed in drilling through soil and rock formations.

BACKGROUND OF THE INVENTION

The use of downhole motors in drilling operations has had limited success due to the short functional life span of drill bits. The life of a drill bit is related to the rotational speed of the drill bit and, heretofore, downhole motors arrangements have tended to rotatably drive the drill bit at relatively high rotational speeds. As a result, premature drill bit failure would result and, each time a drill bit would become worn, valuable drilling hours would be lost as the drill string would be removed from the borehole, the bit replaced and the drill string reinserted into the borehole. While the solution, reduction of the rotational speed of the drill bit, has been recognized for several years, downhole drill bit drive tools have nevertheless failed to meet expectations primarily because of drive shaft bearing failure and inadequate torque transmitting capability. Typically, a tubular bearing housing would be secured to the downhole end of the drill string to house a drill bit drive mandrel. Radial and thrust bearings would be interposed between the housing and mandrel to transmit radial and axial loads between the housing and mandrel during drilling operations and while raising and lowering the drill string from and into the borehole.

By way of background and as is well known in the this field, a drilling fluid, or "drilling mud" as it is known in the field, is pumped under pressure down the interior of the drill string to the drill bit and the fluid together with cuttings are returned to the surface along the exterior of the drill string. The fluid pressure at the bottom of the bore hole is considerable.

In one prior downhole drill bit drive arrangement, a controlled amount of drilling mud was allowed to pass through the bearing assemblies. However, the drilling mud was found to cause premature failure of the bearings and, accordingly, this approach was deemed an unsatisfactory solution to the problem. Various attempts at sealing the bearing and speed reduction mechanism have had little success. In addition to these difficulties, there still existed the problem of fitting a speed reduction mechanism within the constraints of a tubular housing which had substantially the same outside diameter of the drill string while being capable of meeting the high torque requirements.

Apart from the problems related to the presence of drilling mud in the bearings, the axial bearings of prior art devices have tended to fail prematurely because of inadequate load carrying capacity and/or unequal load distribution. Thus, one of the axial bearings would be subjected to a greater load than others of the bearings and fail first. Once this occurred the remaining bearings would fail soon thereafter.

SUMMARY OF THE INVENTION

The primary object of one aspect of the present invention is to provide an improved sealing arrangement for the bearing assembly of a downhole drill bit drive apparatus.

Thus, in accordance with one aspect of the invention, there is provided an improvement in a downhole drill bit drive apparatus having a tubular casing adapted to be secured to the downhole end of a drill string, a mandrel concentrically disposed within the casing and having one end adapted to be secured to downhole rotary drive means and an other end adapted to be secured to a drill bit, bearing means disposed between the casing and the mandrel to permit rotation of the mandrel with respect to the casing and transmitting axial and radial loads between the casing and the mandrel, the casing and the mandrel defining a fluid flow passage for transmitting drilling fluid to a drill bit secured to the mandrel. The improvement comprises first seal means interposed between the housing and mandrel at one end of the bearing means, the first seal means defining one end of a bearing chamber for housing the bearing means and a lubricating fluid for lubricating the bearing means, and being operable to seal the chamber from the fluid flow passage and maintain the pressure in the flow passage and in the chamber substantially at equilibrium; and second seal means interposed between the housing and mandrel at the other end of the bearing means, the second seal means defining the other end of the bearing chamber and being operable to seal the chamber from the exterior of the chamber.

The primary object of another aspect of the present invention relates to the provision of an improved axial bearing configuration capable of bearing axial loads to which the drill bit drive apparatus is normally subjected.

Thus, in accordance with another aspect of the invention, there is provided the improvement in a downhole drill bit drive apparatus having a tubular housing adapted to be secured to the downhole end of a drill string, a mandrel concentrically disposed within the casing and having one end adapted to be secured to downhole rotary drive means and an other end adapted to be secured to a drill bit, first bearing means between the casing and the mandrel for maintaining concentricity and transmitting radial forces therebetween and second bearing means including at least one pair of bearing assemblies disposed between the housing and the mandrel for transmitting axial forces from the housing to the mandrel during drilling operations. The improvement comprises means associated with the each pair of bearing assemblies for substantially equally distributing between the bearing assemblies thereof axial loads applied to the pair of bearing assemblies.

The primary object of a further aspect of the present invention relates to the provision of a gear reduction mechanism for a drill bit downhole drive apparatus.

In accordance with this aspect of the invention, there is provided a speed reducing means disposed in the bearing chamber, the speed reducing means comprising an internal axial spline formed on an inner surface of the housing, the mandrel including a driving mandrel section having one end adapted to be secured the rotary drive means and an opposed end having an external axial spline thereon, the opposed end being disposed in radially opposed relation with respect to the internal spline of the casing, a driven mandrel section coaxially aligned with the first mandrel section and having one end adapted to be secured to a drill bit for rotatingly driving the drill bit, and an opposed end adapted to telescopically receive the opposed end of the driving mandrel section and be disposed intermediate the internal and external splines, and planetary gear means mounted in the opposed end of the driven mandrel section for meshing engagement with each of the internal and external splines, the splines and the planetary gear means being dimensioned such that the angular rotation of the driven mandrel section is less than the angular rotation of the driving mandrel section.

BRIEF DESCRIPTION OF THE DRAWINGS

These and other features of the invention will become more apparent from the following description in which reference is made to the appended drawings, wherein.

DETAILED DESCRIPTION OF AN EMBODIMENT

Figure 1:
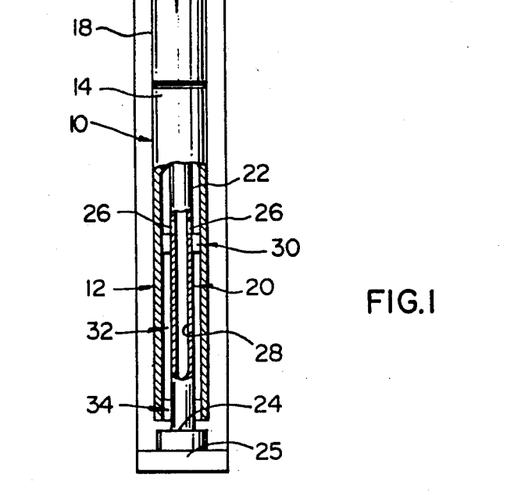
FIG. 1 is a partially diagrammatic illustration of a downhole drive apparatus of the present invention secured to the downhole end of a drill string.

With reference to FIG. 1 of the drawings, there is diagrammatically illustrated a downhole, drill bit drive apparatus, generally designated by reference numeral 10. The apparatus is comprised of a tubular housing or casing 12 having a string end 14 adapted to be secured to the downhole end of a conventional drill string 18. A mandrel 20 is concentrically disposed within the housing and has a drill string end 22 adapted to be secured to a downhole rotary drive means (not shown) and a bit end 24 adapted to be secured to a drill bit 25. Bearing means is disposed between the housing and the mandrel to permit rotation of the mandrel with respect to the housing and transmit axial and radial loads between the housing and the mandrel in a manner explained more fully later. The drill string end 22 of the mandrel is formed with a plurality of radial fluid passages 26 for receiving, in a longitudinal internal channel 28 thereof, drilling fluid delivered by means of surface pumps down the drill string 18 and into the drill string end 14 of the housing. Channel 28 delivers the drilling fluid to the drill bit secured to the mandrel, as is well known.

A first seal means 30 is provided at the drill string ends of the housing and mandrel to define the drill string end of a bearing chamber 32 which houses the bearing means, a lubricating fluid for lubricating the bearing means and a speed reducing mechanism, if the latter is provided. As explained more fully later, the first seal means is operable to seal the bearing chamber from the drilling fluid and maintain the pressure in the drilling fluid passage and in the bearing chamber substantially equal. A second seal means 34 is disposed at the bit end of the bearing means and defines the other end of the bearing chamber. The second seal means is operable to seal the bearing chamber from the exterior of the chamber.

With particular reference to FIGS. 2a-2e, which illustrate an embodiment of the invention without speed reduction, the drill string end 14 of the housing 12 will be seen to be threadedly engaged with an adaptor sub 36 which, in turn, is secured to the downhole end of the drill string. To permit assembly of the bearings and other internal components of the apparatus, the housing is formed in two parts including a top sub 40 and a bearing housing 42, threadedly secured together in end-to-end relation, as shown. An end cap 44 is threadedly secured to the bit end of bearing housing 42 and houses the second seal means 34 referenced earlier.

The drill string end 22 of the mandrel is threadedly engaged with a coupling member 46 which, in turn, is threadedly secured to the output shaft 48 of the downhole motor (not shown). The mandrel is constructed in two parts including a wash pipe 50 at the drill string end and a main mandrel 52 at the bit end threadedly engaged together in end-to-end relation.

Figure 2A:
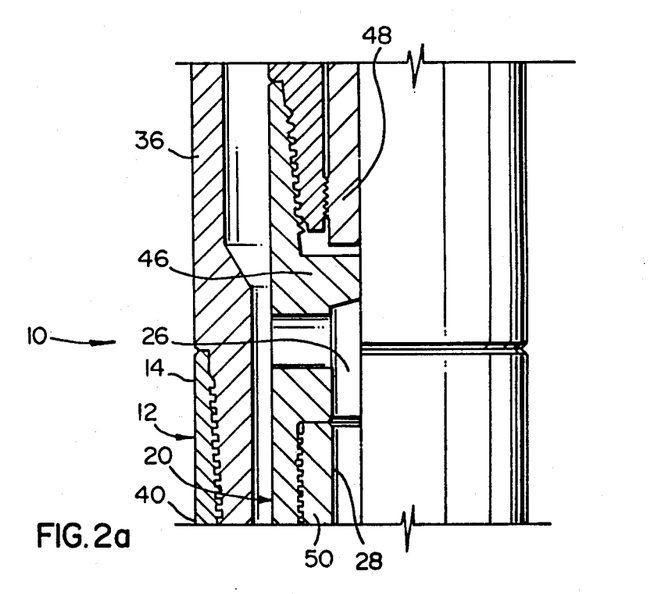
FIGS. 2a-2e are longitudinal cross-sectional views of an embodiment of the downhole drive apparatus of the present without speed reduction.
Figure 2B:
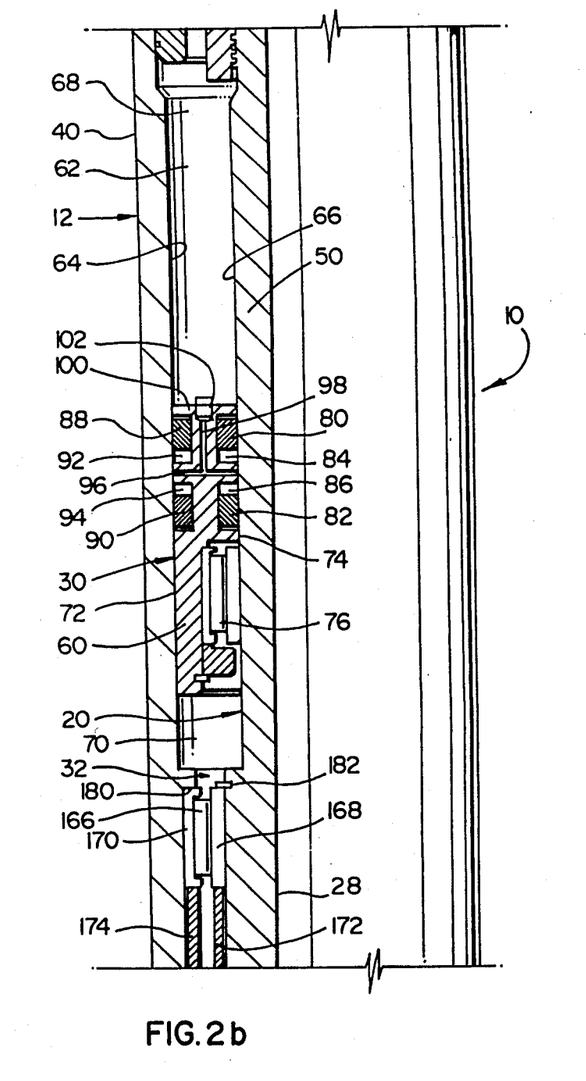

With reference to FIG. 2b, first seal means 30 will be seen as being comprised of an annular piston 60 disposed in a piston chamber 62 having an outer wall 62 formed in top sub 40 and an inner wall 66 formed by wash pipe 50 of mandrel 20. Drill string end 68 of the piston chamber opens into the drilling fluid flow passage while the bit end 70 of the piston chamber opens into bearing chamber 32. The piston is formed with generally cylindrical outer and inner walls 72 and 74, respectively, concentrically disposed in the piston chamber in sealing engagement with the outer and inner walls of the piston chamber. The piston is axially movable in the piston chamber in response to a pressure differential between the drilling fluid flow passage and the bearing chamber whereby to equalize the pressure therebetween. A roller bearing 76 is disposed between the piston and the wash pipe to permit rotation of the mandrel with respect to the piston and maintain concentricity between the mandrel, piston and housing. The bearing and its races are axially movable with the piston.

A first pair of axially spaced, inner floating seals 80 and 82 are respectively disposed in seal grooves 84 and 86 formed in inner wall 74 of the piston for sealingly engaging piston chamber inner wall 66 while a second pair of axially spaced, outer floating seals 88 and 90, respectively, are disposed in seal grooves 92 and 94 formed in piston outer wall 72 for sealingly engaging piston chamber outer wall 64. A pair of radial passages 96 (only one is shown) extend between piston inner wall 74 and piston outer wall 72 between the seals 80 and 82 of the inner pair of seals and seals 88 and 90 of the outer pair of seals. A pair of axial passages 98 (only one is shown) extend from drill string end face 100 of the piston and each communicates with one of the radial passages. A grease nipple 102 is provided in end face 100 for feeding grease or like fluid under pressure into passages 98 and 96, between adjacent inner walls 66 and 74 of the piston and chamber and adjacent outer walls 64 and 72 of the chamber and piston and into seal grooves 84, 86, 92 and 94 to urge the seals to the distal ends of their respective grooves. Once the grooves have been filled with an appropriate fluid, nipple 102 is replaced with a plug (not shown).

Thus, it will be seen that during the normal course of operation, a differential in pressure between the drilling fluid passage and the bearing chamber will cause axial displacement of the piston within the piston chamber in the direction of lower pressure thus tending to equalize the pressure between the drilling fluid passage and the bearing chamber. This reduces the likelihood of leakage of drilling fluid into the bearing chamber. Further, as the pressure increases on either end of the piston, such pressure will be transmitted to the axial outer faces of the inner and outer seals against the pressure of the fluid on the inner sides of the grooves, thus enhancing the sealing effort of the seals.

Figures 2C, 2D:
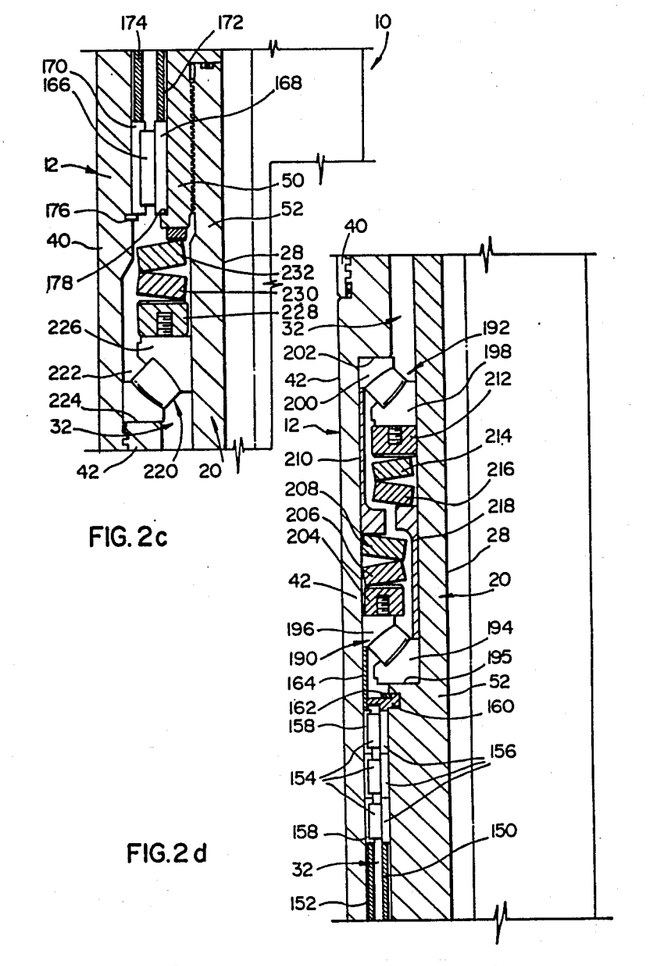
Figure 2E:
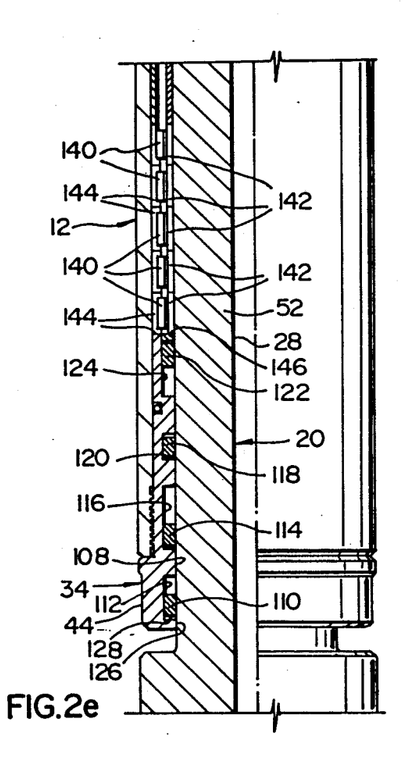

With reference to FIG. 2e, second seal means 34 will be seen to be housed within end cap 44 which is threadedly secured in the bit end of bearing housing 42 of housing 12. Seal means 34 is provided with, in bore 108 thereof, a first floating seal 110 disposed in seal groove 112, a second floating seal 114 disposed in a seal groove 116, a fixed seal 118 disposed in a seal groove 120 and a third floating seal 122 disposed in a seal groove 124. A seepage passage 126 extends from seal groove 112 between the bore of the end cap and the outer surface of main mandrel 52 for communicating fluid under pressure from the exterior of the housing to bit end face 128 of seal 110. The seals are packed with a suitable fluid or grease with the floating seals being urged thereby to the positions shown in FIG. 2e.

Fixed seal 118 is intended to serve as the primary seal between the bearing chamber and the exterior of the housing while the remaining floating seals are intended to serve as backup seals in the event that seal 118 fails. In addition, seals 110 and 114 are intended to keep fixed seal 118 properly lubricated by preventing drilling fluid from reaching and contaminating fixed seal 118.

Figure 4:
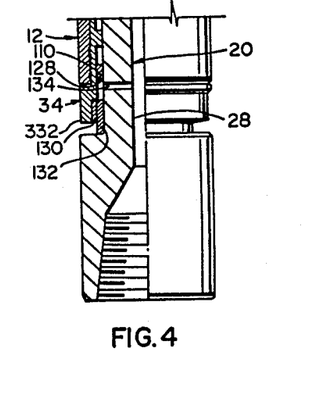
FIG. 4 is a partially broken, longitudinal cross-sectional view of an end cap.

In lieu of the seepage passage, there may be provided, as shown in FIG. 4, an additional groove 130 at the bit end of the end cap 44, a flow restrictor 132 positioned therein and a radial fluid passage 134 extending between channel 28 and the bit end of face 128 of seal 110. In this manner, drilling fluid under pressure is communicated directly to seal 110.

With reference to FIG. 2e, a series of five cylindrical roller bearings 140 are provided at the bit end of the bearing chamber 30 between bearing housing 42 and main mandrel 52 for transmitting radial forces between the housing and the mandrel. Each is provided with an inner race 142 and an outer race 144. Inner race 142 of the bit end bearing 140 is held against a shoulder 146 formed by a profile on the outer surface of the main mandrel 52 while outer race 144 thereof is held against the string end of end cap 44. The inner and outer races of the other four of bearings 140 are held in end-to-end relation by the bit ends of an inner spacer sleeve 150 and an outer spacer sleeve 152.

With reference to FIG. 2d, a second series of three cylindrical roller bearings 154 are provided generally midway of the length of the housing and mandrel for transmitting radial forces therebetween. The inner and outer races 156 and 158 of the bit-end bearing 154 are held against the drill string ends of inner and outer spacer sleeves 150 and 152 while the inner race of drill string end bearing 154 is held against a retaining ring 160 which, in turn, is held in position by a snap ring 162. The outer race of the string end bearing is held in position by the bit end of a spacer sleeve 164.

With reference to FIGS. 2b and 2c, a third series of two cylindrical roller bearings 166 are provided at the string end of the apparatus between top sub 40 and wash pipe 50 to transmit radial forces therebetween. Inner and outer races 168 and 170 thereof are spaced apart by inner and outer spacer sleeves 172 and 174, respectively. The bit end of the outer race of the bit end bearing is held against a snap ring 176 while the inner race thereof is held against a shoulder 178 formed on the outer surface of wash pipe 50. The string end of the outer race of the string end bearing 166 is held against a shoulder 180 formed on the inner surface of top sub 40 of the housing while the inner race thereof is held against a snap ring 182.

With reference to FIG. 2d, there is provided a pair of spherical roller bearings 190 and 192 for transmitting axial loads from the drill string and housing to the mandrel during drilling operations. Bearings 190 and 192 are arranged in such a manner that the axial loads are distributed substantially equally between the two bearings. Bearing 190 is provided with an inner race 194 held against a shoulder 195 formed on the outer surface of main mandrel 52 and an outer race 96 held against the drill string end of spacer sleeve 164. Bearing 192 is provided with an inner race 198 and an outer race 200 held against a shoulder 202 formed on the inner surface of bearing housing 42. Disposed between outer race 196 of bearing 190 and outer race 200 of bearing 192 are a compression ring 204, which bears against race 196, a pair of disc springs 206 and 208, and a sleeve 210, the string end of which bears against outer race 200. Similarly disposed between inner race 194 of bearing 190 and inner race 198 of bearing 192 are a compression ring 212, which bears against inner race 198, a pair of disc springs 214 and 216, and a sleeve 218, the bit end of which bears against inner race 194. The compression rings serve to evenly and centrally distribute the spring loads against their respective races and maintain the bearings axially and compressively loaded. A further spherical roller bearing 220 is provided to support the weight of the mandrel and associated components when the drill string is raised. Bearing 220 is provided with an outer race 222 held against the string end 224 of bearing housing 42 and an inner race 226 which is urged against the rollers by means of a compression ring 228 and pair of disc springs 230 and 232 compressed between the compression ring and the bit end of wash pipe 50.

Reference will now be made to FIGS. 3a-3e, which illustrate an embodiment of the invention provided with a speed reducer. This embodiment, generally designated by reference numeral 300, is substantially the same as that of FIGS. 2a-2e except for the inclusion of the speed reducing mechanism, generally designated by the numeral 310. Thus, embodiment 300 is provided with a housing 312 which includes an adaptor sub 314, a top sub 316 and a bearing housing 318 and a mandrel, generally designated by reference numeral 320, including a coupling member 322, a wash pipe 324, and a main mandrel 326. An annular piston 328 is concentrically disposed in an annular piston chamber 330 at the string end of the apparatus while an end cap 332, and associated seals, is provided at the bit end of the apparatus.

Figure 3A:
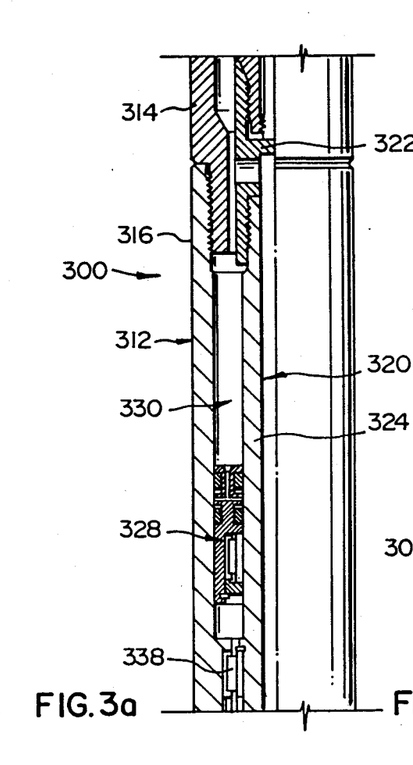
FIGS. 3a-3e are longitudinal cross-sectional views of an embodiment of the downhole drive apparatus of the present invention with speed reduction.

A first series of five cylindrical roller bearings 334 (FIGS. 3d and 3e), a second series of three cylindrical roller bearings 336 (FIG. 3d) and a third series of two cylindrical roller bearings 338 (only one of which is shown in FIG. 3a) are provided for transmitting radial forces between the housing and the mandrel. A pair of spherical roller bearings 339 (FIG. 3d) are provided for transmitting drill string and housing axial loads to the mandrel during normal drilling operations. The components just referenced are identical to corresponding components in the embodiment of FIGS. 2a-2e and, accordingly, will not be described in further detail.

Figure 3B:
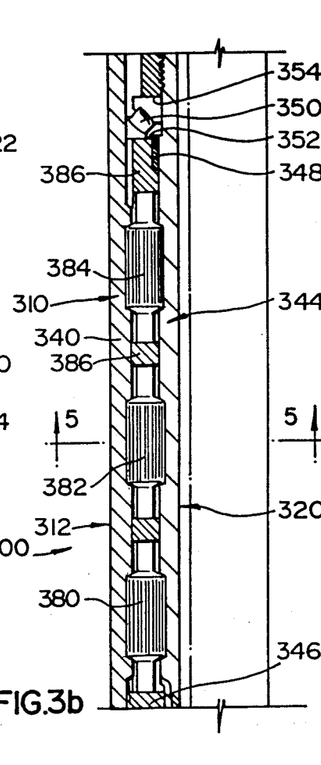
Figure 3C:
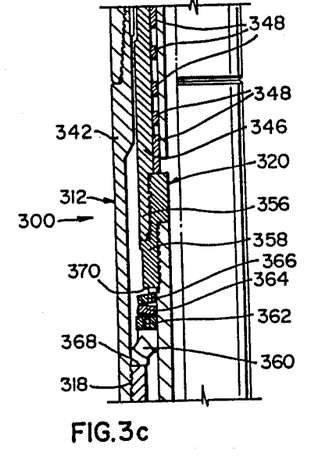
Figure 3D:
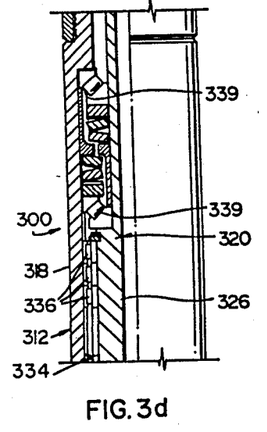
Figure 3E:
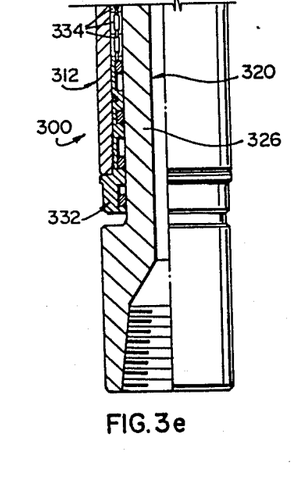

With particular reference to FIGS. 3b and 3c, the housing will be seen to be further comprised of a stationary gear housing 340 and a barrel member 342 threadedly secured together in end-to-end relation. The string end of gear housing 340 is threadedly secured through the bit end of top sub 316 while the bit end of barrel member 342 is threadedly secured to the bit end of bearing housing 318.

Figure 5:
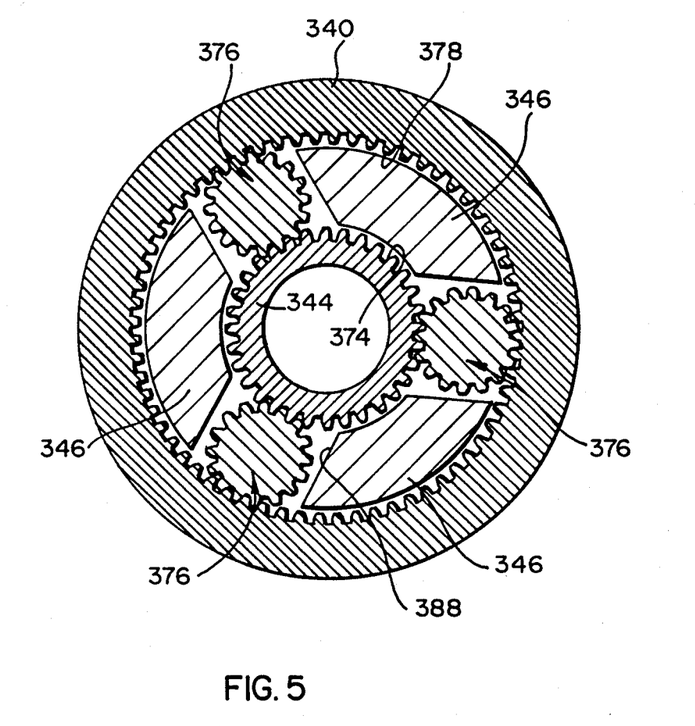
FIG. 5 is a cross-sectional view taken along line 5—5 of FIG. 3.

Mandrel 320 further includes a gear mandrel member 344, the string end of which is threadedly secured to wash pipe 324 and, thus, is rotatably driven thereby. Gear mandrel 344 is telescopically received within a gear cage 346 (FIGS. 3b and 5). A plurality of bushings 348 are disposed between the gear cage and the gear mandrel for transmitting radial forces therebetween while permitting relative rotation thereof. A spherical roller bearing 350 is positioned between string end 352 of the gear cage and bit end 354 of wash pipe 324. Bit end 356 (FIG. 3c) of the gear cage is threadedly secured to a gear cage coupling 358 which, in turn, is threadedly secured to main mandrel 326. The cage coupling serves to transmit torque from the cage coupling to the main mandrel. A spherical roller bearing 360, a compression ring 362 and a pair of disc springs 364 and 366 are positioned between the string end 368 of bearing housing 318 and bit end 370 of gear cage 358.

As best shown in FIG. 5, gear mandrel 344 is formed with an external axial spline or gear 374 which meshes with three driven planetary gear assemblies 376 while gear housing 340 is formed with an internal axial spline or gear 378 which also meshes with the gears assemblies. In order to transmit the high torque required, each planetary gear assembly 376 is comprised of three coaxially aligned gears 380, 382 and 384 (see FIG. 3b) suitably journaled in bearing blocks 386 slidably received in pockets 388 of gear cage 346 for rotation about their respective axis and epicyclic movements about the axis of the mandrel. The speed reducer shown provides a speed reduction ratio of 3:1.

It will be understood that various modifications and alterations may be made to the above described embodiments of the invention without departing from the spirit of the following claims.

The embodiments of the invention in which an exclusive property or privilege is claimed are defined as follows:

1. In a downhole drill bit drive apparatus having a tubular housing adapted to be secured to the downhole end of a drill string, a mandrel concentrically disposed within said housing and having one end adapted to be secured to a downhole rotary drive means and an other end adapted to be secured to a drill bit, bearing means disposed between said housing and said mandrel to permit rotation of said mandrel with respect to said housing and transmit axial and radial loads between said housing and said mandrel, said housing and said mandrel defining a fluid flow passage for transmitting drilling fluid to a drill bit secured to said mandrel, the improvement comprising:

first seal means at one end of said bearing means, said first seal means defining one end of a bearing chamber for housing said bearing means and a lubricating fluid for lubricating said bearing means and being operable to seal said chamber from said fluid flow passage and maintain the pressure in said flow passage and in said chamber substantially at equilibrium;

second seal means at the other end of said bearing means, said second seal means defining the other end of said bearing chamber and being operable to seal said chamber from the exterior of said chamber;

said first seal means including an annular piston chamber, said housing defining an outer wall of said piston chamber and said mandrel defining an inner wall of said piston chamber, one end of said piston chamber communicating with said fluid flow passage, the other end of said piston chamber communicating with said bearing chamber, annular piston means concentrically disposed within said piston chamber in sealing engagement with said inner and outer walls of said piston chamber, said piston means being axially movable in said piston chamber in response to a pressure differential between the fluid pressure in said fluid flow passage and the fluid pressure in said bearing chamber to a position whereat said fluid pressures are substantially equal; further including roller bearing means for rotating mounting said piston means on said mandrel to permit rotation of said mandrel with respect to said piston.

2. The improvement of claim 1, said piston means having an inner wall adjacent the inner wall of said piston chamber and an outer wall adjacent the outer wall of said piston chamber and further including a first pair of axially spaced, inner floating seals disposed in respective seal grooves formed in said piston means inner wall sealingly engaging said piston chamber inner wall, a second pair of axially spaced, outer floating seals disposed in respective seal grooves in said piston means outer wall for sealingly engaging said piston chamber outer wall, said grooves being adapted to receive a fluid in such a manner than their respective seals of each said pair of seals are axially urged apart.

3. The improvement of claim 2, further including first port means extending between said piston means inner wall and said piston means outer wall between said seals of each said pair of first and second seals, and second port means extending from said first port means to an end of said piston chamber, said first and second port means being operable to communicate a lubricating fluid into each said groove.

4. The improvement of claim 3, said first port means comprising at least two radial fluid passages extending between said inner and outer walls of said piston means and said second port means comprising at least two axial fluid passages, each communicating with one of said radial fluid passages.

5. The improvement of claim 1, said second seal means including a fixed seal between said housing and said mandrel.

6. In a downhole drill bit drive apparatus having a tubular housing adapted to be secured to the downhole end of a drill string, a mandrel concentrically disposed within said housing and having one end adapted to be secured to a downhole rotary drive means and an other end adapted to be secured to a drill bit, bearing means disposed between said housing and said mandrel to permit rotation of said mandrel with respect to said housing and transmit axial and radial loads betwen said housing and said mandrel, said housing and said mandrel defining a fluid flow passage for transmitting drilling fluid to a drill bit secured to said mandrel, the improvement comprising:

first seal means at one end of said bearing means, said first seal means defining one end of a bearing chamber for housing said bearing means and a lubricating fluid for lubricating said bearing means and being operable to seal said chamber from said fluid flow passage and maintain the pressure in said flow passage and in said chamber substantially at equilibrium;

second seal means at the other end of said bearing means, said second seal means defining the other end of said bearing chamber and being operable to seal said chamber from the exterior of said chamber;

said second seal means including at least one seal groove at the bit end of the bore of said housing, a floating seal disposed in said seal grove and sealingly engageable with said mandrel, said floating seal having an exterior end face facing the bit end of said housing and an interior end face facing said bearing chamber, a fixed seal between said housing and said mandrel, said fixed seal being axially spaced from said floating seal toward the drill string end of said housing, a seepage passage extending from said seal grove to the exterior of said housing for communicating fluid under pressure from the exterior of said housing into said seal groove and exposing said exterior end face thereto, said floating seal being axially movable in said seal groove in response to a pressure differential across said floating seal to reduce said pressure differential.

7. The improvement of claim 6, further including a second seal groove disposed between said first mentioned floating seal and said fixed seal, a second floating seal disposed in said second seal groove, said second seal having an exterior face adjacent said inner face of said first mentioned floating seal and an inner face remote from said inner face of said first mentioned floating seal, said second floating seal being axially movable in said second seal groove in response to a pressure differential across said second floating seal whereby to reduce said pressure differential.

8. The improvement of claim 7, further including a third seal groove axially disposed on the side of said fixed seal remote from said second floating seal, a third floating seal disposed in said third seal groove for sealing engagement with said housing and said mandrel, said third floating seal being axially movable in response to a pressure differential thereacross whereby to reduce said pressure differential.

9. The improvement of claim 1, further including speed reducing means disposed in said bearing chamber, said speed reducing means comprising:

an internal axial spline formed on an interior surface of said housing;

said mandrel including a driving mandrel section rotatably mounted in said housing, said driving mandrel section having one end adapted to be secured to rotary drive means at the downhole end of said drill string and an opposed end having an external axial spline thereon, said opposed end being disposed in radially opposed relation with respect to said internal spline of said housing;

a driven mandrel section rotatably mounted in said housing, said driven mandrel section being coaxially aligned with said first mandrel section and having one end adapted to be secured to a drill bit for rotatingly driving said drill bit, and an opposed end adapted to telescopically receive said opposed end of said driving mandrel section and be disposed intermediate said internal and external splines; and planetary gear means rotatably mounted in said opposed end of said driven mandrel section for meshing engagement with each said internal and external splines, said splines and said planetary gear means being dimensioned such that the angular rotation of said driven mandrel section is less than the angular rotation of said driving mandrel section.

10. In a downhole drill bit drive apparatus having a tubular housing adapted to be secured to the downhole end of a drill string, a mandrel concentrically disposed within said housing and have one end adapted to be secured to a downhole rotary drive means and an other end adapted to be secured to a drill bit, first bearing means between said housing and said mandrel for maintaining concentricity and transmitting radial forces therebetween, second bearing means including at least one pair of bearing assemblies disposed between said housing and said mandrel for transmitting axial forces between said housing and said mandrel, the improvement comprising:

means associated with said two bearing assemblies for substantially equally distributing to said bearing assemblies of each said pair of bearing assemblies axial loads applied to said pair of bearing assemblies, wherein one of said bearing assemblies of each said pair of bearing assemblies having an outer race abuttingly engaging a shoulder in an inner surface of said housing and an inner race disposed on said mandrel, the other bearing assembly of each said pair of bearing assemblies having an inner race engaging a shoulder on said mandrel and an outer race engaging said inner surface of said housing, first and second disc spring means and inner and outer sleeve means, one end of said inner sleeve means abuttingly engaging said inner race of said other bearing assembly, the other end of said inner sleeve engaging one end of one of said disc spring means, the other end of said one of said disc spring means engaging said inner race of said one of said bearing assembly whereby to urge said inner race of said other bearing assembly against said mandrel shoulder and said inner race of said one bearing assembly axially towards said outer race thereof, one end of said outer sleeve means abuttingly engaging said outer race of said other bearing assembly, the other end of said outer sleeve engaging one end of the other of said disc spring means, the other end of said other of said disc spring means engaging said outer race of said one bearing assembly whereby to urge said outer race of said one bearing assembly against said housing shoulder and said outer race of said other bearing assembly axially toward said inner race thereof.

11. The improvement of claim 10, said shoulders being arranged such that said bearing assemblies transmit axial loads from said housing to said mandrel during drilling operations.

12. The improvement of claim 11, further including a third bearing assembly arranged to transmit axial loads from said mandrel to said housing when said drill string is raised.

13. The improvement of claim 11, said bearing assemblies being spherical roller bearings.

* * * * *